(No Model.)
H. JOHNSON.
ROLLER SKATE WHEEL.
No. 355,399. Patented Jan. 4, 1887.
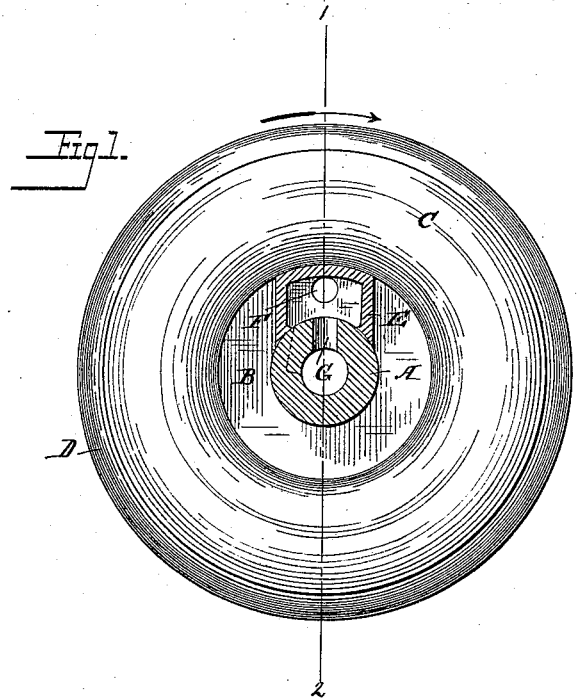
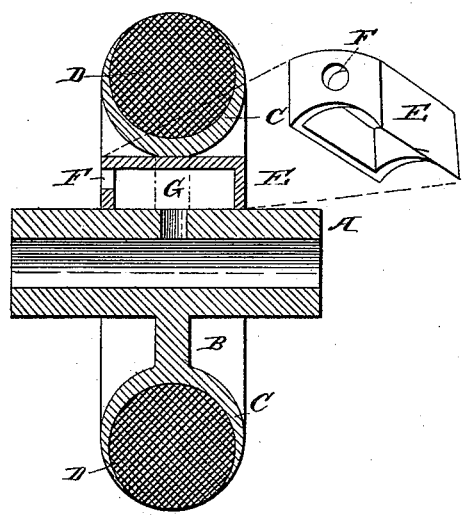
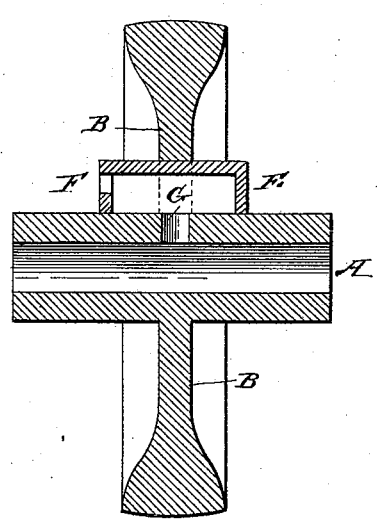
Attests:
John G. Hinkel Jr.
A. E. J. Fansmann.
Inventor:
Henry Johnson,
By Foster Freeman
attys.

UNITED STATES PATENT OFFICE.

HENRY JOHNSON, OF PHILADELPHIA, PENNSYLVANIA.

ROLLER-SKATE WHEEL.

SPECIFICATION forming part of Letters Patent No. 355,399, dated January 4, 1887.

Application filed May 26, 1886. Serial No. 203,327. (No model.)

*To all whom it may concern:*

Be it known that I, HENRY JOHNSON, a citizen of the United States, residing in the city and county of Philadelphia, and State of Pennsylvania, have invented certain new and useful Improvements in Roller-Skates, of which the following is a specification.

This invention relates to that class of rollers which are adapted for use in roller-skates, and more particularly that class of rollers having elastic tires and lubricant-receptacles; and it consists in a peculiarly-formed seat for the tire, whereby the same is firmly retained therein, and also in a lubricant-receptacle that may be entirely removed from the roller proper.

In the drawings, Figure 1 represents a side elevation of the roller with the hub and lubricant-receptacle in section; Fig. 2, a section on the line 1 2 of Fig. 1, and Fig. 3 a modified form of wheel.

The rollers, as shown, are designed especially for skates having single rollers; but they may be used in pairs, if so desired.

I prefer to have the hub A, especially when the rollers are used singly, project considerably from each side of the roller proper, so that the leverage of the said roller on the axle is reduced to a minimum, and the liability of the bore of the said hub becoming enlarged from wear caused by the said leverage, and the consequent looseness and rocking of the roller on its axle, is obviated.

The web B of the roller may be formed with or without openings, and spokes may be used in place of the web. The periphery of the said roller is formed of a frame, C, crescent-shaped in cross-section, and having the space between the ends of the horns thereof less than the diameter of the said crescent; but, instead of being in the form of a crescent, the frame may be circular in cross-section, with a portion of the outer edge cut away. The said frame in either form constitutes a seat for a suitable tire, (shown in the drawings as consisting of a ring, D, circular in cross-section.) This ring D, which may be constructed of any resilient material, preferably rubber, is expanded by any suitable means until it embraces the roller, when it may be forced into the seat formed by the frame. The rubber ring should be of slightly greater diameter than the interior of the frame C, so that the said ring may fit tightly in its seat, whereby slipping of the same is obviated, and a portion of the said ring be expanded at its outer side, so as to cover the edges of the said frame C, which will bite into said exposed portion of the rubber and hold it. The shape of the frame causes it to clasp the ring and prevent the same from being accidentally forced from its seat.

Should it be desirable to use skates on hard surfaces—such as would be liable to quickly wear rubber—I form the rollers with solid rims, as shown in Fig. 3. I also provide the roller with a removable device of suitable shape, whereby lubricating material is supplied to the axle.

One form I have shown in the drawings as consisting of a three-sided box, E, with a small opening, F, in one end, near the upper side. The bottom of the box is open and the lower edge of the sides thereof is suitably curved to fit the hub snugly. The hub is provided with a passage, G, which extends from the exterior to the bore.

The web of the roller is provided with a transverse recess, in which fits the box E, and the said web may embrace the said box closely enough to retain it in place, the box being preferably of a length equal to or somewhat greater than the diameter of the periphery of the roller. The box E, being removable, may be readily provided with any suitable material—such as waste, sponge, felt, and the like—for retaining the lubricant, which may be supplied from time to time through the orifice or opening F. The waste may be omitted, if desired, and the opening F plugged after the box is filled with the lubricant. The box being removable, the cleaning of the same is greatly facilitated and the operation of casting the roller simplified and cheapened.

The passage G may extend through the hub at an angle, as shown in dotted lines, Fig. 1, and from near one side of the box E, so that the roller when revolving will, by centrifugal force, throw the lubricant into the said passage, which latter will carry it to the axle.

The roller may be formed of any suitable material; but I prefer to construct it, as shown in Figs. 1 and 2, of brass, by casting, and the one shown in Fig. 3, of iron, by casting. I prefer to form the hub, web, and peripheral seat in one piece.

If so desired, the lubricant-receptacle may be cast on the hub instead of being removable.

I am aware that it is not new to provide a wheel with a lubricant-receptacle secured removably on or in a recess in the hub, and therefore make no claim to such constructions.

Without limiting myself to the precise construction and arrangement of parts shown, I claim—

1. The combination, in a roller for skates, of a hub having a passage extending from the exterior to the bore, a web with a transverse aperture therein adjacent to the said passage, and a removable lubricant-receptacle consisting of a bottomless box fitting the recess in the web, and with its open side toward the hub and covering the passage therein, substantially as described.

2. A roller provided with a hub having a bore and an oil-passage and a web with a transverse aperture therethrough adjacent to the oil-passage, combined with a removable oil-receptacle provided with an opening communicating with the said oil-passage, and fitting and extending through the aperture in the web, whereby the web will retain the oil-receptacle on the hub against centrifugal action without the use of fastening devices, substantially as described.

3. The combination, with a roller having formed in one piece a hub, web, and peripheral seat substantially circular in cross-section and expanding below its opening, of a resilient tire adapted to be contained in and extended beyond said seat, substantially as described.

4. The combination, with a roller having a peripheral seat substantially circular in cross-section and expanding below its opening, of a resilient tire substantially circular in cross-section and of greater diameter than the interior of the seat, whereby the tire, when inserted, expands at its outer side and covers the edges of the seat, substantially as described.

5. A roller for skates having a hub provided with a passage communicating with its bore, a removable lubricant-receptacle, a peripheral seat substantially circular in cross-section and expanding below its opening, and a resilient tire adapted to be contained in said seat, substantially as described.

6. A roller for skates having a hub, web, and peripheral seat formed of one piece, a resilient tire adapted to said seat, and a removable lubricant-receptacle secured on the hub exterior thereto, substantially as described.

In testimony whereof I have signed my name to this specification in the presence of two subscribing witnesses.

HENRY JOHNSON.

Witnesses:
WM. A. REDDING,
FRANCIS S. BROWN.